(12) United States Patent
Abe

(10) Patent No.: US 8,271,280 B2
(45) Date of Patent: Sep. 18, 2012

(54) VOICE RECOGNITION APPARATUS AND MEMORY PRODUCT

(75) Inventor: Kenji Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1000 days.

(21) Appl. No.: 12/243,383

(22) Filed: Oct. 1, 2008

(65) Prior Publication Data

US 2009/0150148 A1    Jun. 11, 2009

(30) Foreign Application Priority Data

Dec. 10, 2007  (JP) ................................ 2007-318853

(51) Int. Cl.
G10L 15/06      (2006.01)

(52) U.S. Cl. ............ 704/243; 704/9; 704/251; 704/270; 704/255; 704/244; 379/88.01; 379/88.04; 379/88.02; 707/999.005

(58) Field of Classification Search .................. 704/251, 704/243, 270, 275, 246, 255, 256, 244, 254, 704/257, 9, 236, 241, 231, 10; 379/88.04, 379/88.01, 88.02; 434/167, 157, 185, 169, 434/156; 707/999.005

See application file for complete search history.

(56) References Cited

U.S. PATENT DOCUMENTS

| | | | | |
|---|---|---|---|---|
| 5,909,666 | A * | 6/1999 | Gould et al. ................... | 704/251 |
| 6,088,428 | A * | 7/2000 | Trandal et al. ............... | 379/88.02 |
| 6,208,963 | B1 * | 3/2001 | Martinez et al. .............. | 704/232 |
| 6,535,850 | B1 * | 3/2003 | Bayya ........................... | 704/239 |
| 6,865,533 | B2 * | 3/2005 | Addison et al. ............... | 704/260 |
| 7,013,276 | B2 * | 3/2006 | Bickley et al. ................ | 704/255 |
| 2002/0072907 | A1 * | 6/2002 | Case ............................. | 704/260 |
| 2006/0106604 | A1 | 5/2006 | Okimoto | |
| 2008/0133228 | A1 * | 6/2008 | Rao .............................. | 704/231 |
| 2008/0221891 | A1 * | 9/2008 | Konig et al. .................. | 704/252 |
| 2009/0209319 | A1 * | 8/2009 | Okada ........................... | 463/20 |

FOREIGN PATENT DOCUMENTS

| | | |
|---|---|---|
| JP | 10-55196 | 2/1998 |
| JP | 11-7292 | 1/1999 |
| JP | 11-30994 | 2/1999 |
| JP | 2000-99082 | 4/2000 |
| JP | 2003-122391 | 4/2003 |
| JP | 2004-133003 | 4/2004 |
| WO | 2004/044887 | 5/2004 |

OTHER PUBLICATIONS

Japanese Office Action mailed Sep. 13, 2011 in corresponding Japanese Patent Application No. 2007-318853.

\* cited by examiner

*Primary Examiner* — Vijay B Chawan
(74) *Attorney, Agent, or Firm* — Staas & Halsey LLP

(57) ABSTRACT

A voice recognition apparatus can reduce false recognition caused by matching with respect to the phrases composed of a small number of syllables, when it performs a recognition process, by a pronunciation unit, for voice data based on voice produced by a speaker such as a syllable and further performs recognition by a method such as the Word Spotting for matching with respect to the phrases stored in the phrase database. The voice recognition apparatus performs a recognition process for comparing a result of the recognition process by a pronunciation unit with the extended phrases obtained by adding the additional phrase before and/or behind the respective phrases.

14 Claims, 9 Drawing Sheets

FIG. 1A
RELATED ART
VOCAL CONTENT: 選択できない地域という一番目の文字が消えないので先へ進めない

FIG. 1B
RELATED ART
RECOGNITION RESULT:
SENTAKUDEKINAITIIKITOIUITIBANMENOMOJIGAKIENAINODESAKIESUSUMENAI

FIG. 1C
RELATED ART

PHRASE DB

| READING | WRITING |
|---------|---------|
| ITI     | —       |
| KIE     | 消え     |

F I G. 3

| PHRASE | | EXTENDED PHRASE | |
|---|---|---|---|
| READING | WRITING | READING | WRITING |
| KIE | 消え | KIENAI | 消えない |
| | | KIEMASU | 消えます |
| | | KIERU | 消える |
| | | KIERUTOKI | 消えるとき |
| | | KIETYATTA | 消えちゃった |
| | | KIE_ | 消え |
| KIDOU | 起動 | KIDOUSINAI | 起動しない |
| | | KIDOUSIMASU | 起動します |
| | | KIDOUSURU | 起動する |
| | | KIDOUSURUTOKI | 起動するとき |
| | | KIDOUSUREBA | 起動すれば |
| | | KIDOUSIRO | 起動しろ |
| | | KIDOUDEKIRU | 起動できる |
| | | KIDOUDEKINAI | 起動できない |
| | | KIDOUGADEKINAI | 起動ができない |
| | | KIDOU_ | 起動 |

FIG. 4

| PHRASE | | EXTENDED PHRASE | |
|---|---|---|---|
| READING | WRITING | READING | WRITING |
| ITI | 一 | ITIBAN | 一番 |
| | | ITIBANME | 一番目 |
| | | ITIMAI | 一枚 |
| | | ITIMAIME | 一枚目 |
| | | ITIJI | 一時 |
| | | ITIJIKAN | 一時間 |
| | | ITIGATU | 一月 |
| | | ASAITI | 朝一 |
| | | HIRUITI | 昼一 |
| | | GOGOITI | 午後一 |
| GAMEN | 画面 | GAMENJOU | 画面上 |
| | | GAMENTYUUOU | 画面中央 |
| | | MIGIGAMEN | 右画面 |
| | | HIDARIGAMEN | 左画面 |

F I G. 8A    VOCAL CONTENT:
          I paid one dollar as a price of this wonderful paper F I G. 8B    RECOGNITION RESULT:
          あい ぺいどう わん だらー あず あ ぷらいす おぶ でぃす わんだふる ぺいぱー
          (AI PEIDU  WAN DARAA  AZU A  PURAISU  OBU  DISU  WANDAFURU  PEIPAA)

F I G. 8C

PHRASE DB

| READING | WRITING |
|---------|---------|
| WAN | one |
| PEI | pay |

F I G. 8D

EXTENDED PHRASE DB

| READING | WRITING |
|---------|---------|
| WANDARAA | one dollar |
| WANDAFURU | wonderful |
| PEIZU | pays |
| PEIDU | paid |

FIG. 9A  VOCAL CONTENT: 八号有一件事,所以九号我和他见面一起喝酒了

FIG. 9B  RECOGNITION RESULT: ぱーはお よう いーじぇんしー、
(BAAHAO YOU IIJENSII
すおい じょうはお うおふた— じぇんみえん いーち ふーじょう ら
SUOI JOUHAO UOFUTAA JIENMIEN IITI FUUJOU RA)

FIG. 9C
PHRASE DB

| READING | WRITING |
|---|---|
| JOU | 九 |
| JIEN | 件 |

FIG. 9D
EXTENDED PHRASE DB

| READING | EXTENDED PHRASE WRITING |
|---|---|
| JOUHAO | 九号 |
| JOUDEIEN | 九点 |
| IIJIEN | 一件 |
| SANJIEN | 三件 |

VOICE RECOGNITION APPARATUS AND MEMORY PRODUCT

CROSS-REFERENCE TO RELATED APPLICATION

This application is based upon and claims the benefit of priority of the prior Japanese Patent Application No. 2007-318853, filed on Dec. 10, 2007, the entire contents of which are incorporated herein by reference.

FIELD

The present invention relates to: a voice recognition apparatus for recognizing, by a pronunciation unit, voice data based on vocalization, referring to a phrase database which stores a plurality of phrases having one or a plurality of pronunciation units, comparing a result of recognition by the pronunciation unit with the phrases stored in the phrase database, and recognizing a phrase, which is composed of one or a plurality of pronunciation units, included in the voice data; and a memory product which stores a computer program for realizing the voice recognition apparatus.

BACKGROUND

A voice recognition process has already been put to practical use for creating text data based on vocal content for voice data based on voice produced by a speaker. Text data created by the voice recognition process is in practical use for a variety of applications such as an audio-typing process to write down the content of the dialogue at a call center, for example. Text data may also be created by a word unit and utilized as a keyword for summarizing the content of the dialogue at a call center, for example, and further for retrieving related information.

In a voice recognition process, voice is recognized by a pronunciation unit, such as a syllable, on the basis of a feature quantity obtained by analyzing voice data based on vocalization and voice is recognized as a phrase listed in a word dictionary, by performing a matching operation referring to a word dictionary which lists phrases in a method such as the Word Spotting, for example. A technique to increase the vocabulary is described in Japanese Laid-Open Patent Publication No. 11-7292, for example, as a method to raise the recognition rate.

SUMMARY

According to an aspect of the invention, a voice recognition apparatus for performing a first recognition process to recognize, by a pronunciation unit, voice data based on vocalization, referring to a phrase database which stores a plurality of phrases composed of one or a plurality of pronunciation units, comparing a result of the first recognition process with the phrases stored in the phrase database, and performing a second recognition process to recognize a phrase, which is composed of one or a plurality of pronunciation units, included in the voice data. The voice recognition apparatus includes a priority recognition section for comparing the result of the first recognition process with a plurality of extended phrases, which are obtained by adding an additional phrase before and/or behind the respective phrases stored in the phrase database, to recognize the extended phrase included in the voice data, in priority to the second recognition process.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIGS. 1A, 1B and 1C are explanatory views for conceptually showing an instance of false recognition in a voice recognition process;

FIG. 3 is an explanatory view for conceptually showing the memory content of a conjugation dictionary database provided in the voice recognition apparatus according to the embodiment;

FIG. 4 is an explanatory view for conceptually showing the memory content of a co-occurrence dictionary database provided in the voice recognition apparatus according to the embodiment;

FIGS. 8A, 8B, 8C and 8D are explanatory views for conceptually showing an example of application of the voice recognition apparatus according to the embodiment to recognition of English; and FIGS. 9A, 9B, 9C and 9D are explanatory views for conceptually showing an example of application of the voice recognition apparatus according to the embodiment to recognition of Chinese.

DESCRIPTION OF EMBODIMENT

Figure 2:
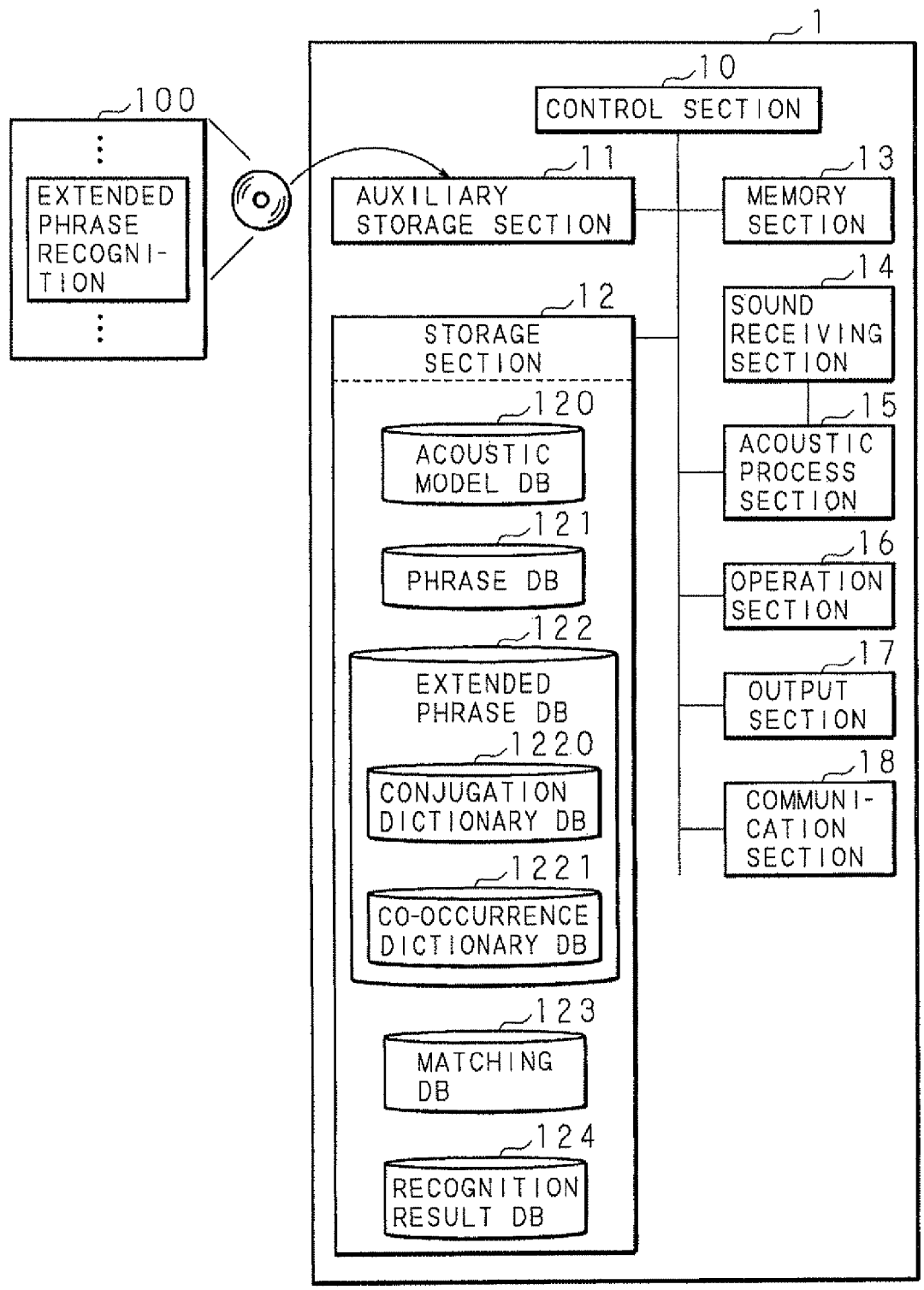
FIG. 2 is a block diagram for showing the configuration of a voice recognition apparatus according to one embodiment.

In a voice recognition process, voice is recognized by a pronunciation unit, such as a syllable, on the basis of a feature quantity obtained by analyzing voice data based on vocalization and voice is recognized as a phrase listed in a word dictionary, by performing a matching operation referring to a word dictionary which lists phrases in a method such as the Word Spotting, for example.

However, there is a problem that false recognition may be caused by inappropriate matching based on the words, which are composed of a small number of syllables, listed in a word dictionary, at a stage of performing a matching operation referring to the word dictionary after recognition by a pronunciation unit.

FIGS. 1A, 1B and 1C are explanatory views for conceptually showing an instance of false recognition in a voice recognition process. FIG. 1A shows an example of vocal content of "選択できない 地域という一番目の 文字が消えないので 先へ 進めない(reading: sentakudekinai tiikitoiu itibanmeno mojiga kienainode sakie susumenai)". FIG. 1B shows a result of recognition of the vocal content in FIG. 1A by a pronunciationunitand"せんたくできないちいきというい ち ばんめのもじがきえないのでさきえすすめない(reading: sentakudekinaitiikitoiuitibanmenomojigakienainodesakiesusumena i)" is obtained by the recognition process. FIG. 1C shows a word dictionary to be used for voice recognition. The word dictionary lists phrases such as the number "⋯"pronounced as "iti" and "消え"pronounced as "kie". When a recognition process for the vocal content in FIG. 1B is performed using the word dictionary shown in FIG. 1C, false recognition occurs such that not only "いち(reading: iti)" included in "いちばんめ(reading: itibanme)" but also "いち(reading: iti)" in "せんたくできないいちいき(reading: sentakudekinai-tiuki)" is recognized as the number "⋯"Similarly, a problem occurs such that not only "きえ(reading: kie)" in "もじがきえない(reading: mojigakienai)" but also "きえ(reading: kie)" in "さきえすすめない(reading: sakiesusumenai)" is falsely recognized as a phrase "消え".As exemplified in FIGS. 1A, 1B and 1C, a conventional voice recognition process has a problem that the words composed of a small number of syllables tend to cause false recognition. Although a technique for raising the recognition rate by increasing the vocabulary is disclosed in the Japanese Laid-Open Patent Publication No. 11-7292, it is difficult to eliminate false recognition by the technique since the words composed of a small number of syllables still exists.

In the case of a voice recognition process for English wherein a pronunciation unit is a unit represented by a pronunciation symbol, for example, it should be noted that false recognition may also occur such that the head part of the word "wonderful" is recognized as a word "one".

Moreover, when the pronunciation of a speaker is unclear, false recognition may occur such that, in recognition of "いち(-)(reading: iti)" in "いちばん(一番)(reading: itiban)", "い(reading: i)" is recognized as "み(reading: mi)" and "いち(-) (reading: iti)" is recognized as "みち(道)(reading: miti)".

Priority is given to a recognition process by matching with respect to a plurality of extended phrases using an extended phrase database which stores the extended phrases obtained by adding an additional phrase before and/or behind the respective phrases stored in a phrase database for storing the phrases such as the words. In this manner, since priority is given to matching with respect to the extended phrases having a large number of syllables over matching with respect to the phrases composed of a small number of syllables, it is possible to reduce false recognition based on the phrases composed of a small number of syllables such as false recognition of "いち(reading: iti)" in "できないちいき(できない地域)(reading: dekinaituiki)" as "いち(-) (reading: iti)" or false recognition of "いち(-)(reading: iti)" in "いちばん(一番)(reading: itiban)" as "みち(道) (reading: miti)", for example.

The following description will explain an embodiment in detail with reference to the drawings. FIG. 2 is a block diagram for showing the configuration of a voice recognition apparatus according to one embodiment. Denoted at 1 in FIG. 2 is a voice recognition apparatus according to the embodiment wherein a computer is used. The voice recognition apparatus 1 comprises: a control section 10 such as a CPU for controlling the entire apparatus; an auxiliary storage section 11 such as a CD-ROM drive for reading various information from a memory product such as a CD-ROM which stores various information such as data and a program such as a computer program 100 according to the embodiment; a storage section 12 such as a hard disk which stores various information read by the auxiliary storage section 11; and a memory section 13 such as a RAM for storing temporarily information which is produced. A computer operates as the voice recognition apparatus 1 according to the embodiment when the control section 10 causes the memory section 13 to store the computer program 100 stored in the storage section 12 and executes the computer program 100. It should be noted that it is possible to speed up processing when the control section 10 includes a sub-processor such as a DSP for performing a variety of processes related to voice, though the control section 10 may be constituted of a single CPU.

The voice recognition apparatus 1 further comprises: a sound receiving section 14 such as a microphone for receiving voice produced by a speaker; an acoustic process section 15 for performing a variety of processes for voice received by the sound receiving section 14; an operation section 16 such as a mouse or a keyboard; an output section 17 such as a monitor or a loudspeaker; and a communication section 18 to be connected with a communication network such as the Internet. The acoustic process section 15 comprises: a gain amplifier for amplifying sound received by the sound receiving section 14; an A/D converter circuit for converting an amplified sound signal into a digital signal; and a control circuit such as a Digital Signal Processor (DSP) for executing various acoustic processes for a voice signal, which is a digital signal.

A part of the storage area of the storage section 12 of the voice recognition apparatus 1 according to the embodiment is used as various databases such as: an acoustic model database (acoustic model DB) 120 for storing a feature quantity indicative of the feature of voice data as an acoustic model in a pronunciation unit such as a syllable; a phrase database (phrase DB) 121 for storing a plurality of phrases composed of one or a plurality of pronunciation units; an extended phrase database (extended phrase DB) 122 for storing a plurality of extended phrases obtained by extending the respective phrases stored in the phrase database 121; a matching database (matching DB) 123 for storing the phrases and the extended phrases to be used for matching; and a recognition result database (recognition result DB) 124 for storing the result of a voice recognition process for voice data.

The phrase database 121 is a database to be used as a dictionary in a voice recognition process and stores "reading" composed of one or a plurality of pronunciation units and "writing" in Japanese in association with each other. In the case of Japanese, a pronunciation unit equals to a syllable. The phrase database 121 stores, for example, reading "i" composed of one pronunciation unit and writing "胃" in association with each other. The phrase database 121 also stores reading "iti" composed of two pronunciation units and writing "⋯"in association with each other. The phrase database 121 further stores, for example, reading "kie" and writing "消え" in association with each other.

The extended phrase database 122 is a database which stores the extended phrases obtained by adding an additional phrase before and/or behind the respective phrases stored in the phrase database 121 and includes databases such as a conjugation dictionary database 1220 and a co-occurrence dictionary database 1221. It should be noted that the extended phrase database 122 may not be divided into a plurality of databases such as the conjugation dictionary database 1220 and the co-occurrence dictionary database 1221 but be constructed as one database or a plurality of databases classified in detail.

FIG. 3 is an explanatory view for conceptually showing the memory content of the conjugation dictionary database 1220 provided in the voice recognition apparatus 1 according to the embodiment. The conjugation dictionary database 1220 is a database for storing the extended phrases obtained by adding a suffix as an additional phrase to a plurality of stems which are the respective phrases stored in the phrase database 121. Stored in the example shown in FIG. 3 are reading and writing of extended phrases, such as "消えない(reading: kienai)", "消えます(reading: kiemasu)" and "消える(reading: kieru)", obtained by adding suffixes, such as "ない", "ます"and "る",as additional phrases to a stem "消え"which is a phrase stored in the phrase database 121 with reading "kie" and writing "消え".The conjugation dictionary database 1220 also stores an extended phrase such as "消えちゃった(reading: kietyatta)" which is a colloquial expression. The conjugation dictionary database 1220 further stores an extended phrase "消え_"obtained by adding a blank character (space) as an additional phrase to a phrase "消え".This is to enable a recognition process using the conjugation dictionary database 1220 even for vocalization of a phrase "消え(reading: kie)" excluding a suffix. It should be noted that a prefix may be added before a stem as an additional phrase, though FIG. 3 shows an example of adding a suffix behind a stem as an additional phrase.

FIG. 4 is an explanatory view for conceptually showing the memory content of the co-occurrence dictionary database 1221 provided in the voice recognition apparatus 1 according to the embodiment. The co-occurrence dictionary database 1221 is a database for storing a plurality of phrases, which have a high possibility of co-occurrence with respect to the respective phrases excluding an additional phrase, among extended phrases respectively obtained by adding an additional phrase before and/or behind the respective phrases stored in the phrase database 121. In the example shown in FIG. 4, reading and writing of extended phrases such as "一番(reading: itiban)", "一番目(reading: itibanme)", "一枚 (reading: itimai)", "一時(reading: itiji)", "朝一(reading: asaiti)" and "昼一(reading: hiruiti)" are stored for a phrase which is stored in the phrase database 121 with reading "iti" and writing "一."

The matching database 123 is a database wherein the phrases of a part of the memory content of the phrase database 121 is replaced by the extended phrases stored in the extended phrase database 122. For example, a record which associates reading "kie" with writing "消え"stored in the phrase database 121 is replaced by a record which associates reading such as "kienai", "kiemasu" and "kieru" with writing such as "消えない","消えます"and "消える".

Next, a process of the voice recognition apparatus 1 according to the embodiment will be explained. The voice recognition apparatus 1 according to the embodiment executes the computer program 100 with the control section 10 to create various program modules for executing various processes such as a phrase extension process for extending a phrase and a voice recognition process for recognizing voice on the basis of an extended phrase, and performs a variety of processes, which will be explained below, with functions of various program modules.

Figure 5:
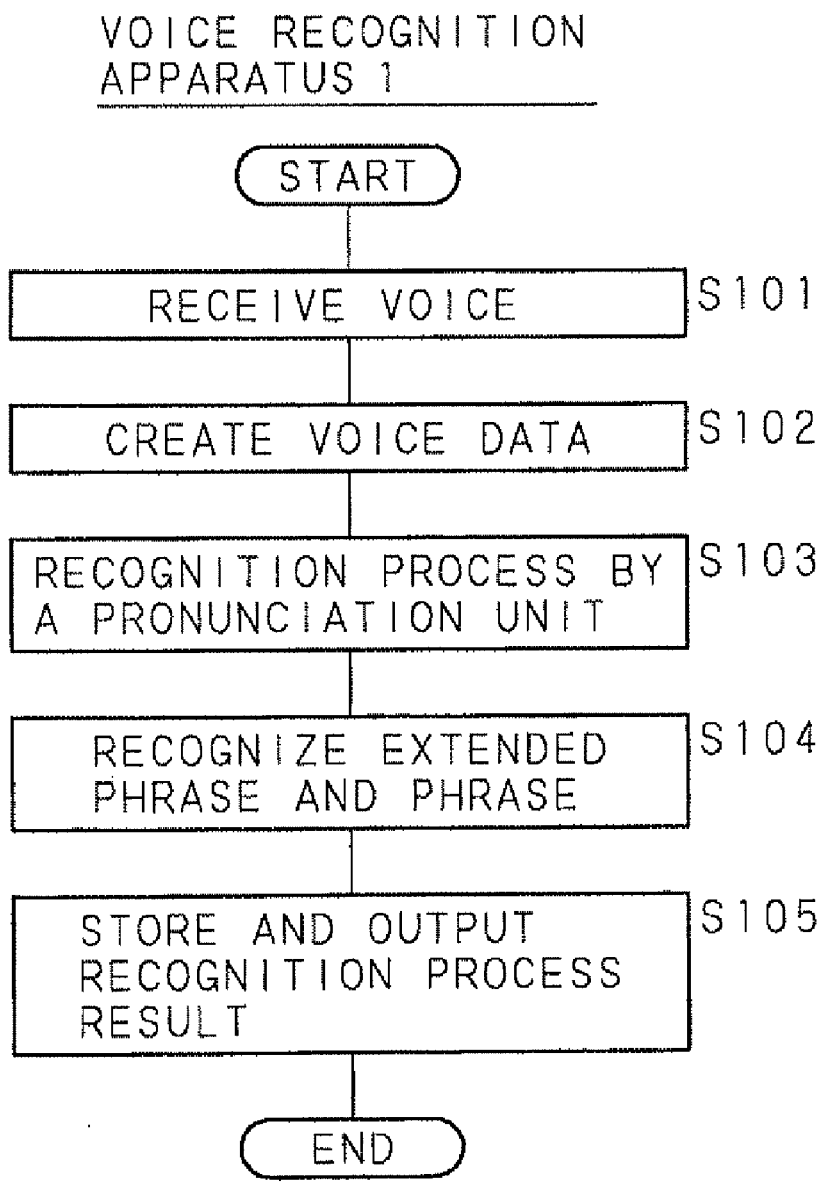
FIG. 5 is an operation flow for showing a voice recognition process of the voice recognition apparatus according to the embodiment.

FIG. 5 is an operation flow for showing a voice recognition process of the voice recognition apparatus 1 according to the embodiment. The voice recognition apparatus 1 receives voice produced by a speaker at the sound receiving section 14 (S101) under control of the control section 10 for executing the computer program 100. The voice recognition apparatus 1 amplifies an analog signal based on the received sound with the acoustic process section 15 and further converts the analog signal into a digital signal to create voice data (S102).

The voice recognition apparatus 1 creates a plurality of frames having a predetermined time length from created voice data by processing of the acoustic process section 15 under control of the control section 10. The voice recognition apparatus 1 converts created voice data in a frame unit, which is a signal on a time axis, into a spectrum which is a signal on a frequency axis. The voice recognition apparatus 1 extracts feature quantities such as power, pitch and cepstrum from a spectrum obtained by conversion and compares the extracted feature quantities with acoustic models stored in the acoustic model database 120 to perform a recognition process by a pronunciation unit for voice data (S103). A recognition process by a pronunciation unit in the operation S103 is a process of recognizing voice data by a pronunciation unit such as a syllable. For example, the process is for recognizing the content of pronunciation"せんたくできないちいきといういちばんめのもじがきえないのでさきえすすめない"for voice data indicative of vocal content"選択できない地域という番目の文字が消えないので先へ進めない"produced by a speaker. Said recognition process can be seen as recognition of reading which is stored in databases such as the phrase database 121, the extended phrase database 122 and the matching database 123. It should be noted that a voice section detection process based on a feature quantity is executed as preprocessing of the recognition process in the operation S103. The voice section detection process is a process for detecting a frame including voice from voice data. By performing a recognition process only for voice data in a section wherein inclusion of voice is detected in the voice section detection process, it is possible to prevent false recognition of voice in a noise section which does not include voice.

The voice recognition apparatus 1 then compares voice data in a pronunciation unit, which is the result of the recognition process in the operation S103, with the extended phrases and the phrases stored in the matching database 123 under control of the control section 10 to perform a recognition process for recognizing an extended phrase and a phrase included in voice data (S104). The recognition process in the operation S104 is a process for identifying one or a plurality of pronunciation unit strings, which is matched with any one of the extended phrases and the phrases, in voice data in a pronunciation unit as a matching extended phrase or a matching phrase. For example, a recognition process is performed for voice data in a pronunciation unit"せんたくできないちいきといういちばんめのもじがきえないのでさきえすすめない(reading: sentakudekinaitiikitoiuitibanmenomojigakienainodesakiesusumena i)" to identify a pronunciation unit string "いちばんめ(itibanme)" as "一番目"and a pronunciation unit string "きえない(kienai)" as "消えない".Since specific phrases are preliminarily replaced by the extended phrases, the voice recognition apparatus 1 according to the embodiment can eliminate, for example, false recognition of recognizing a pronunciation unit string "できないちいき(dekinaitiiki)" as "できな一いき"and false recognition of recognizing a pronunciation unit string "さきえすすめない(sakiesusumenai)" as "さ消えすすめない".It should be noted that the voice data may be identified as recognition result for a part of a phrase which does not include an extended phrase or identified as recognition result for an extended phrase, when voice data in a pronunciation unit is identified with an extended phrase. In particular, when "いちばんめ(itibanme)" is identified as "一番目", the part "いち(iti)" of "いちばんめ(itibanme)" may be recognized as "一"of "一番目"or "いちばんめ(itibanme)" may be recognized as"一番目".

In the operation S104, the matching database 123 is a database which stores the phrases obtained by replacing a part of the respective phrase stored in the phrase database 121 by the extended phrases. Thus, the matching process in the operation S104 is a recognition process for performing a recognition process by matching with respect to an extended phrase stored in the extended phrase database 122 in priority to a recognition process by matching with respect to the phrases stored in the phrase database 121. Accordingly, the recognition process in the operation S104 can be developed to a variety of methods such as, without using the matching database 123, performing a recognition process by matching with respect to the phrases stored in the phrase database 121 after performing a recognition process by matching with respect to the extended phrases to be used for matching among extended phrases stored in the extended phrase database 122. As described above, the voice recognition apparatus 1 according to the present invention can eliminate false recognition based on the phrases composed of a small number of pronunciation units, by giving priority to a recognition process based on the extended phrases.

In the recognition process of the operation S104, a score indicative of the similarity between voice data and any one of the extended phrases is calculated, and it is determined that voice data in a pronunciation unit and the extended phrase are matched when the calculated score is larger than or equal to a predetermined value. A score indicative of the similarity is calculated by obtaining the similarity between a feature quantity at a section which is a subject for matching of voice data and a feature quantity of the acoustic model related to the extended phrase by a predetermined method. It should be noted that the overall similarity may be calculated not by simply comparing a feature quantity of voice data with a feature quantity of the acoustic model related to the extended phrase but by separately obtaining the similarity between voice data and a part corresponding to the phrase, e.g. a part corresponding to a stem, and the similarity between voice data and a part corresponding to the additional phrase, e.g. a part corresponding to a suffix, as to the phrase and the additional phrase composing the extended phrase and summing up the similarities respectively obtained. In this case, the overall similarity may be calculated by weighting, or focusing on, the similarity related to a part corresponding to a stem. By calculating the similarity using weighting, it becomes possible to perform a recognition process placing emphasis on the degree of matching with respect to an original phrase excluding the additional phrase.

The voice recognition apparatus 1 then stores the result of a recognition process in the operation S104 in the recognition result database 124 under control of the control section 10 and outputs the result of a recognition process via the output section 17 (S105). A voice recognition process is executed in such a manner.

Figure 6:
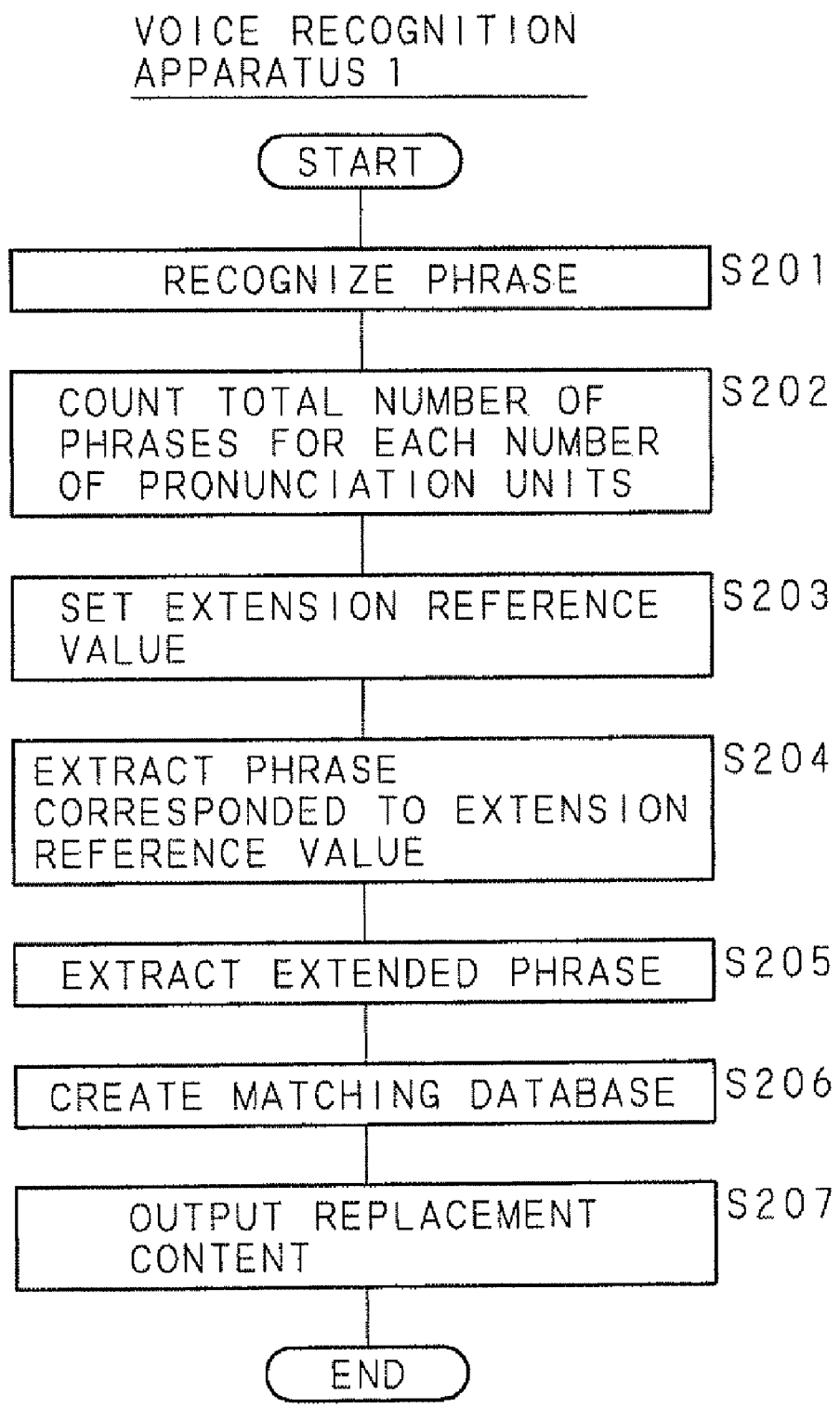
FIG. 6 is an operation flow for showing a phrase extension process of the voice recognition apparatus according to the embodiment.

FIG. 6 is an operation flow for showing a phrase extension process of the voice recognition apparatus 1 according to the embodiment. In the phrase extension process, a phrase is extended on the basis of voice data in a pronunciation unit recognized in the operation S103 of the voice recognition process, for example. The voice recognition apparatus 1 compares voice data in a pronunciation unit recognized in the voice recognition process with the phrases stored in the phrase database 121 under control of the control section 10 for executing the computer program 100 and performs a recognition process for recognizing the phrase included in voice data (S201).

The voice recognition apparatus 1 counts the total number of phrases, which are matched with any one of the phrases stored in the phrase database 121, for each number of pronunciation units under control of the control section 10 (S202). The voice recognition apparatus 1 sets the number of pronunciation units, the number of phrases counted for which exceeds a preset threshold, as an extension reference value which becomes a reference to extraction of the extended phrase (S203). The set extension reference value is stored in the storage section 12.

Figure 7:
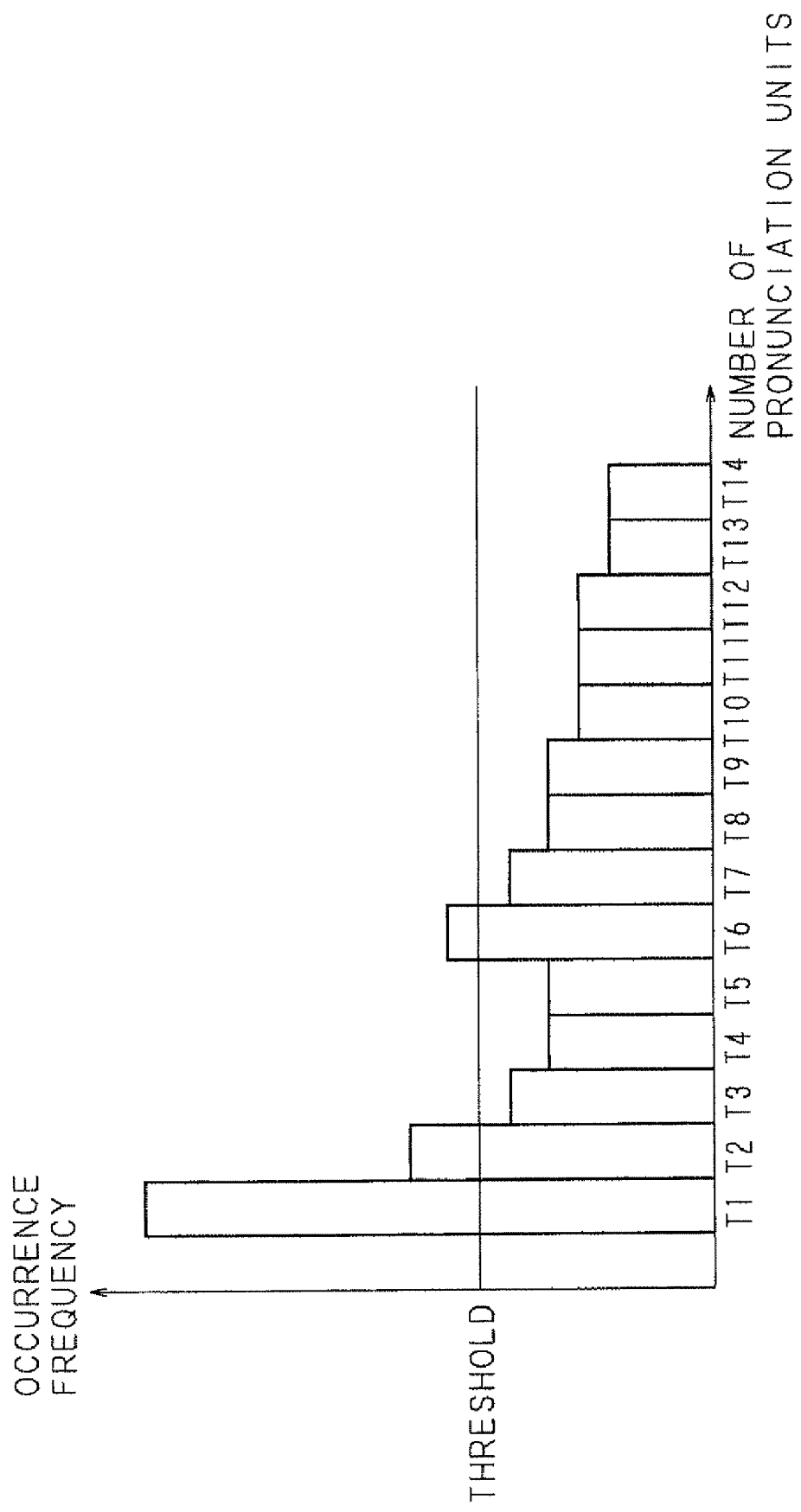
FIG. 7 is a histogram for conceptually showing the phrase extension process of the voice recognition apparatus according to the embodiment.

The following description will explain the process in the operations S202-203 in detail. FIG. 7 is a histogram for conceptually showing the phrase extension process of the voice recognition apparatus 1 according to the embodiment. The histogram exemplified in FIG. 7 shows the relation between the number of pronunciation units, which is shown on the abscissa axis, and the total number of phrases for each number of pronunciation units, i.e. an occurrence frequency, which is shown on the vertical axis. That is, the histogram shown in FIG. 7 shows the total number of phrases counted for each number of pronunciation units in the operation S202. Since the occurrence frequencies of the number of pronunciation units of T1, T2 and T6 exceed a threshold in the histogram shown in FIG. 7, T1, T2 and T6 are set as extension reference values in the operation S203. It should be noted that the present invention can be put into practice in a suitable manner such as setting values smaller than or equal to T6, which is the maximum number of pronunciation units exceeding the threshold, i.e. all values T1 to T6, as extension reference values instead of setting T1, T2 and T6 as extension reference values, or an extension reference value may be set by setting not only the upper limit, e.g. T6, but also the lower limit.

In the process explained in the operations S202 and S203, an extension reference value is set by counting the total number of phrases for each number of pronunciation units. Besides said structure, the total number of phrases may be counted for each phrase and the number of pronunciation units of the phrase, the total number counted for which exceeds a preset threshold, or a value smaller than or equal to said number of pronunciation units may be set as an extension reference value. For example, when the summary count of the total number of occurrence of "いち(iti)" exceeds the threshold, the number "2" of pronunciation units of "いち(iti)" is set as the extension reference value. An extension reference value may also be set coupled with both of the summary count for each number of pronunciation units and a summary count for each phrase.

Furthermore, as a substitute process for the operations S202 and S203, the number of pronunciation units or a value smaller is than or equal to the number of pronunciation units may be set as the extension reference value when the number of phrases counted for each pronunciation units is larger than or equal to a threshold preset based on the number of phrases counted for other number of pronunciation units. That is, a value obtained by subtracting an occurrence frequency of the number of pronunciation units which is a subject for determination from an occurrence frequency of the number of pronunciation units which is larger than the number of pronunciation units that is a subject for determination by one, i.e. a variation, is compared with a threshold so as to determine whether the variation is to be set as the extension reference value or not. For example, a variation such as a value obtained by subtracting an occurrence frequency of T5 from an occurrence frequency of T6, a value obtained by subtracting an occurrence frequency of T4 from an occurrence frequency of T5, . . . , a value obtained by subtracting an occurrence frequency of T1 from an occurrence frequency of T2 in the histogram shown in FIG. 7 is calculated and the calculated variation is set as the extension reference value when the calculated variation exceeds a threshold. Instead of comparison between a series of numbers of pronunciation units, the present invention can to be put into practice in a suitable manner such as setting the extension reference value when a difference from the mean value of an occurrence frequency of other number of pronunciation units is larger than or equal to a threshold. The present invention may further be put into practice in a suitable manner such as referring to a previous recognition result.

Regarding again the operation flow, after setting the extension reference value, the voice recognition apparatus 1 according to the embodiment extracts a phrase, the number of pronunciation units of which corresponds to a set extension reference value, from the phrase database 121 under control of the control section 10 (S204). The voice recognition apparatus 1 extracts an extended phrase obtained by adding an additional phrase to an extracted phrase from the extended phrase database 122 such as the conjugation dictionary database 1220 and the co-occurrence dictionary database 1221 (S205). The voice recognition apparatus 1 creates the matching database 123 by replacing a phrase, the number of pronunciation units of which corresponds to the extension reference value, among phrases stored in the phrase database 121 by the extended phrase extracted in the operation S205 (S206).

The voice recognition apparatus 1 according to the embodiment then outputs the fact that the phrase has been replaced by the extended phrase and the content of replacement from the output section 17 (S207). A phrase extension process is executed in such a manner.

The phrase extension process is executed after a recognition process by a pronunciation unit in the operation S103, every time the voice recognition process explained using FIG. 5, for example, is executed. It should be noted that a phrase extension process may is be preliminarily executed on the basis of a previous recognition result and a recognition process may be executed using the matching database 123 including the result of a phrase extension process which has been already executed. When a phrase extension process is preliminarily executed, initiation of execution of a phrase extension process is triggered by an event, which is suitably set, such as activation of the voice recognition apparatus 1, idling of the voice recognition process or updating of various databases.

Although the memory content of the extended phrase database 122 provided in the voice recognition apparatus 1 according to the embodiment can be updated by human work, it is also possible to design the extended phrase database 122 so as to automatically cruise around web pages on an external network, such as the Internet, connected via the communication section 18 and retrieve data, which can be obtained by text extraction, for automatic updating.

Although an embodiment to be used for voice recognition of Japanese has been shown in the above embodiment, the embodiment is not limited to this and can be applied to a language other than Japanese, such as English or Chinese. FIGS. 8A, 8B, 8C and 8D are explanatory views for conceptually showing an example of application of the voice recognition apparatus 1 according to the embodiment to recognition of English. FIG. 8A shows voice data indicative of vocal content "I paid one dollar as a price of this wonderful paper" produced by a speaker. FIG. 8B shows a recognition result by a pronunciation unit for the vocal content and shows an example of recognition as "あいぺいどうわん だらーあず あ ぷらいすおぶ でぃすわんだふる ぺいぱ-(ai peidu wan daraa azu a puraisu obu disu wandafuru peipaa)" by a pronunciation unit. FIG. 8C shows a part of memory content of the phrase database 121 and FIG. 8D shows a part of memory content of the extended phrase database 122. The voice recognition apparatus 1 according to the embodiment replaces the phrase "one" (reading: wan) by the extended phrases such as "one dollar" (reading: wandaraa) and "wonderful" (reading: wandafuru), and the phrase "pay" (reading: pei) by the extended phrases such as "pays" (reading: peizu) and "paid" (reading: peidu) for the recognition result by a pronunciation unit shown in FIG. 8B and executes the voice recognition process described above.

FIGS. 9A, 9B, 9C and 9D are explanatory views for conceptually showing an example of application of the voice recognition apparatus 1 according to the embodiment to recognition of Chinese. FIG. 9A shows voice data indicative of vocal content "八号有一件事. 所以九号我和他見面一起喝酒了" produced by a speaker. FIG. 9B shows a recognition result by a pronunciation unit for the vocal content and shows an example of recognition as "ばーーはおよう いーじぇんしーすおいじょうはおうおふたーじぇんみえん いーちふーじょう ら(baahao you iijensi-suoi jouhao uofutaa-jenmien iiti fuujou ra)" by a pronunciation unit. FIG. 9C shows a part of memory content of the phrase database 121 and FIG. 9D shows a part of memory content of the extended phrase database 122. The voice recognition apparatus 1 according to the embodiment replaces the phrase "九"(reading: jou) by the extended phrases such as "九号"(reading: jouhao) and "九点"(reading: joudeien), and the phrase "件"(reading: jien) by the extended phrases such as "一件"(reading: iijien) and "三件"(reading: sanjien) for the recognition result by a pronunciation unit shown in FIG. 9B and executes the voice recognition process described above. Although an example of recognition by a Japanese syllable unit as a pronunciation unit is shown for ease of explanation in the examples explained using FIGS. 8A, 8B, 8C, 8D, 9A, 9B, 9C and 9D, it should be noted that the preset invention can be set in a suitable manner such as recognition by a pronunciation symbol unit.

The above embodiments merely exemplify a part of infinite embodiments, and the configuration of various hardware, software and the like can be suitably designed. For example, although an example of application of a recognition process to sound received at the sound receiving section of the voice recognition apparatus is shown in the above embodiment, the embodiment is not limited to this and can be applied to a variety of forms such as a recognition process based on sound data created by other apparatus which receives sound. Furthermore, the phrase extension process and the voice recognition process described above can also be executed respectively by difference apparatus.

With the present embodiment, a recognition process by matching with respect to the extended phrases is performed in priority to recognition based on the phrases stored in the phrase database. Accordingly, since priority is given to matching with respect to the extended phrases having a large number of pronunciation units over matching with respect to the phrases composed of a small number of pronunciation units, it is possible to eliminate false recognition of recognizing the phrases composed of a small number of pronunciation units and improve the recognition accuracy.

With the present embodiment, since a recognition process is performed after the phrases having the number of pronunciation units, for which a large number of phrases are included in the result of recognition by a pronunciation unit, are replaced by the extended phrases, it is possible to replace the respective phrases having the number of pronunciation units, which are more likely to cause false recognition, by the extended phrases.

With the present embodiment, it is possible to replace the phrases by the extended phrases coupled with the inflected forms of the phrase.

In a voice recognition apparatus and a computer program according to the present invention wherein voice data based on vocalization is recognized by a pronunciation unit, a phrase database which stores the phrases composed of one or a plurality of pronunciation units is referred to, voice data recognized by a pronunciation unit is compared with the phrases stored in the phrase database and a process of recognizing the phrase composed of one or a plurality of pronunciation units included in the voice data is performed, priority is given to a recognition process by matching with respect to the extended phrases obtained by adding the additional phrase before and/or behind the respective phrases stored in the phrase database.

Such a configuration of the present invention guarantees beneficial effects such as improvement of the recognition rate, since the phrases composed of a small number of pronunciation units is eliminated and false recognition based on the phrases composed of a small number of pronunciation units is eliminated.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A voice recognition apparatus for preparing text data with respect to whole voice data based on vocalization, comprising:
   a first recognition processing section that divides the whole voice data by a pronunciation unit for recognizing the whole voice data;
   a phrase database that stores a plurality of phrases having one or a plurality of pronunciation units;
   a priority recognition section that refers to a plurality of extended phrases, which are obtained by adding an additional phrase before and/or behind the respective phrases stored in the phrase database, to recognize the extended phrase for each of the divided voice data; and
   a second recognition processing section that recognizes phrases contained in the whole voice data, in reference to the plurality of phrases stored by the phrase database and the extended phrase recognized by the prior recognition section, wherein
   the text data is configured with the phrases recognized by the second recognition processing section.

2. The voice recognition apparatus according to claim 1, wherein
   said priority recognition section gives priority to a recognition process related to the extended phrases by replacing the phrases stored in the phrase database by the extended phrases.

3. A voice recognition apparatus for preparing text data with respect to whole voice data based on vocalization, comprising:
   a first recognition processing section that divides the whole voice data by a pronunciation unit for recognizing the whole voice data;
   a phrase database that stores a plurality of phrases having one or a plurality of pronunciation units;
   an extended phrase database that stores a plurality of extended phrases obtained by adding an additional phrase before and/or behind the respective phrases stored in the phrase database;
   a section for extracting the phrases having a predetermined number of pronunciation units from the phrase database;
   a section for extracting the extended phrases, which are obtained by adding an additional phrase to the extracted phrases, from the extended phrase database; and
   a priority recognition section that refers to the extracted extended phrases to recognize the extended phrase for each of the divided voice data; and
   a second recognition processing section that recognizes phrases contained in the whole voice data, in reference to the phrases extracted from the phrase database and the extended phrases recognized by the prior recognition section, wherein
   the text data is configured with the phrases recognized by the second recognition processing section.

4. The voice recognition apparatus according to claim 3, further comprising:
   a setting section for setting said predetermined number based on the number of pronunciation units and the number of phrases, which are matched with any one of the phrases stored in the phrase database, in the result of the first recognition process.

5. The voice recognition apparatus according to claim 4, wherein
   said setting section sets the number of pronunciation units, a total number of phrases matched with any one of the phrases stored in the phrase database counted for which exceeds a preset threshold, or a value smaller than or equal to said number of pronunciation units as the predetermined number in the first recognition process.

6. The voice recognition apparatus according to claim 4, wherein
   said setting section sets the number of pronunciation units of the phrases, a total number of phrases matched with any one of the phrases stored in the phrase database counted for which exceeds a preset threshold, or a value smaller than or equal to said number of pronunciation units as the predetermined number in the first recognition process.

7. The voice recognition apparatus according to claim 4, wherein
   said setting section counts a total number of phrases matched with any one of the phrases stored in the phrase database for each number of pronunciation units and sets the number of pronunciation units, the number of phrases counted for which is larger than or equal to a threshold preset based on a number counted for a phrase having other number of pronunciation units, or a value smaller than or equal to said number of pronunciation units as the predetermined number in the first recognition process.

8. The voice recognition apparatus according to claim 3, wherein
   said extended phrase database stores a plurality of extended phrases obtained by adding a suffix and/or a prefix as the additional phrase to respective stems which are the respective phrases stored in the phrase database.

9. The voice recognition apparatus according to claim 3, wherein
said priority recognition section gives priority to a recognition process related to the extended phrases by replacing the phrases stored in the phrase database by the extended phrases.

10. A voice recognition apparatus for preparing text data with respect to whole voice data based on vocalization, comprising:
a phrase database that stores a plurality of phrases having one or a plurality of pronunciation units; and
a controller capable of performing operations of:
dividing the whole voice data by a pronunciation unit;
adding an additional phrase before and/or behind the respective phrases stored in the phrase database;
referring to a plurality of extended phrases, which are obtained by adding the additional phrase, to recognize the extended phrase for each of the divided voice data; and
recognizing phrases contained in the whole voice data, in reference to the plurality of phrases stored by the phrase database and the recognized extended phrase, wherein
the text data is configured with the recognized phrases.

11. A voice recognition apparatus for preparing text data with respect to whole voice data based on vocalization, comprising:
a phrase database that stores a plurality of phrases having one or a plurality of pronunciation units;
an extended phrase database that stores a plurality of extended phrases obtained by adding an additional phrase before and/or behind the respective phrases stored in the phrase database; and
a controller capable of performing operations of:
dividing the whole voice data by a pronunciation unit;
extracting the phrases having a predetermined number of pronunciation units from the phrase database;
extracting the extended phrases, which are obtained by adding an additional phrase to the extracted phrases, from the extended phrase database;
referring to the extracted extended phrase to recognize the extended phrase for each of the divided voice data; and
recognizing phrases contained in the whole voice data, in reference to the extracted phrases from the phrase database and the recognized extended phrases, wherein
the text data is configured with the recognized phrases.

12. A voice recognition apparatus for preparing text data with respect to whole voice data based on vocalization, comprising:
a first recognition processing means for dividing the whole voice data by a pronunciation unit to recognize the whole voice data;
a phrase database that stores a plurality of phrases having one or a plurality of pronunciation units;
priority recognition means for referring to a plurality of extended phrases, which are obtained by adding an additional phrase before and/or behind the respective phrases stored in the phrase database, to recognize the extended phrase for each of the divided voice data; and
a second recognition processing means for recognizing phrases contained in the whole voice data, in reference to the plurality of phrases stored by the phrase database and the extended phrase recognized by the prior recognition means, wherein
the text data is configured with the phrases recognized by the second recognition processing means.

13. A voice recognition apparatus for preparing text data with respect to whole voice data based on vocalization, comprising:
a first recognition processing means for dividing the whole voice data by a pronunciation unit to recognize the whole voice data;
a phrase database that stores a plurality of phrases having one or a plurality of pronunciation units;
an extended phrase database that stores a plurality of extended phrases obtained by adding an additional phrase before and/or behind the respective phrases stored in the phrase database;
means for extracting the phrases having a predetermined number of pronunciation units from the phrase database;
means for extracting the extended phrases, which are obtained by adding an additional phrase to the extracted phrases, from the extended phrase database; and
priority recognition means for referring to the extracted extended phrase to recognize the extended phrase for each of the divided voice data; and
a second recognition processing means for recognizing phrases contained in the whole voice data, in reference to the phrases extracted from the phrase database and the extended phrases recognized by the prior recognition means, wherein
the text data is configured with the phrases recognized by the second recognition processing means.

14. A computer-readable memory product storing a computer-executable computer program for preparing text data with respect to whole voice data based on vocalization, said computer program comprising:
a step of causing a computer to dividing the whole voice data by a pronunciation unit;
a step of causing a computer to perform a first recognition process that divides the whole voice data by a pronunciation unit;
a step of causing the computer to perform a priority recognition processing that refers to a plurality of extended phrases, which are obtained by adding an additional phrase before and/or behind the respective phrases stored in a phrase database that stores a plurality of phrases having one or a plurality of pronunciation units, to recognize the extended phrase for each of the divided voice data; and
a step of causing the computer to perform a second recognition processing that recognizes phrases contained in the whole voice data, in reference to the plurality of phrases stored by the phrase database and the extended phrase recognized by the prior recognition processing, wherein
the text data is configured with the phrases recognized by the second recognition processing.

* * * * *